US009688384B1

(12) United States Patent
Balzer et al.

(10) Patent No.: US 9,688,384 B1
(45) Date of Patent: Jun. 27, 2017

(54) METHODS AND APPARATUS TO CONTROL A GAP BETWEEN MOVABLE AIRCRAFT WING COMPONENTS

(71) Applicants: Michael A. Balzer, Kirkland, WA (US); Jan A. Kordel, Redmond, WA (US)

(72) Inventors: Michael A. Balzer, Kirkland, WA (US); Jan A. Kordel, Redmond, WA (US)

(73) Assignee: The Boeing Company, Chicago, IL (US)

( * ) Notice: Subject to any disclaimer, the term of this patent is extended or adjusted under 35 U.S.C. 154(b) by 750 days.

(21) Appl. No.: 13/623,597

(22) Filed: Sep. 20, 2012

(51) Int. Cl.
B64C 3/50 (2006.01)
B64C 9/02 (2006.01)
B64C 9/16 (2006.01)
B64C 13/28 (2006.01)
B64C 7/00 (2006.01)

(52) U.S. Cl.
CPC .................. B64C 3/50 (2013.01); B64C 7/00 (2013.01); B64C 9/02 (2013.01); B64C 9/16 (2013.01); B64C 13/28 (2013.01)

(58) Field of Classification Search
CPC .... B64C 9/16; B64C 9/02; B64C 7/00; B64C 2009/143; B64C 3/50; B64C 13/28
USPC ....... 244/211, 212, 213, 214, 215, 130, 131, 244/133
See application file for complete search history.

(56) References Cited

U.S. PATENT DOCUMENTS

| 2,261,363 | A | * | 11/1941 | Griswold | 244/90 A |
| 2,329,177 | A | * | 9/1943 | Baker | 244/216 |
| 2,406,919 | A | * | 9/1946 | Stalker | 244/90 R |
| 2,444,293 | A | * | 6/1948 | Holt | B64C 21/08 244/129.1 |
| 3,371,888 | A | * | 3/1968 | Alvarez-Calderon | 244/216 |
| 3,447,761 | A | * | 6/1969 | Wadleigh et al. | 244/15 |
| 3,987,983 | A | * | 10/1976 | Cole | B64C 9/20 244/216 |
| 4,381,093 | A | * | 4/1983 | Rudolph | B64C 9/16 244/216 |
| 4,434,959 | A | * | 3/1984 | Rudolph | 244/215 |
| 4,712,752 | A | * | 12/1987 | Victor | 244/129.1 |
| 4,720,066 | A | * | 1/1988 | Renken et al. | 244/213 |
| 4,784,355 | A | * | 11/1988 | Brine | B64C 9/20 244/213 |
| RE32,907 | E | * | 4/1989 | Rudolph | 244/215 |
| 5,178,348 | A | * | 1/1993 | Bliesner | 244/212 |
| 5,224,670 | A | * | 7/1993 | Padden | 244/123.3 |
| 6,299,109 | B1 | * | 10/2001 | Stephan et al. | 244/215 |
| 6,655,635 | B2 | * | 12/2003 | Maury et al. | 244/131 |
| 7,051,982 | B1 | * | 5/2006 | Johnson | 244/215 |

(Continued)

Primary Examiner — Tien Dinh
Assistant Examiner — Steven Hawk
(74) Attorney, Agent, or Firm — Hanley, Flight & Zimmerman, LLC

(57) ABSTRACT

Methods and apparatus to control a gap between movable aircraft wing components are disclosed. An example apparatus includes a body having a trailing edge and a leading edge. The leading edge is to be coupled to an aircraft wing. The trailing edge is to engage a flap of the aircraft wing. The body includes a structure located between the trailing edge and the leading edge. The structure is to engage the flap to maintain a distance between the body and the flap.

20 Claims, 7 Drawing Sheets

(56) References Cited

U.S. PATENT DOCUMENTS

| | | | |
|---|---|---|---|
| 7,322,547 B2* | 1/2008 | Konings | B64C 3/50 244/214 |
| 7,611,099 B2* | 11/2009 | Kordel et al. | 244/215 |
| 7,708,231 B2* | 5/2010 | Lacy et al. | 244/211 |
| 9,038,964 B2* | 5/2015 | Wildman | B64C 9/20 244/215 |
| 2003/0006344 A1* | 1/2003 | Pauly | 244/130 |
| 2005/0061922 A1* | 3/2005 | Milliere | B64C 9/04 244/213 |
| 2006/0145012 A1* | 7/2006 | Hernandez | 244/130 |
| 2006/0145013 A1* | 7/2006 | Gomez | 244/130 |
| 2010/0288887 A1* | 11/2010 | Parker | 244/213 |
| 2010/0327121 A1* | 12/2010 | Mcalinden et al. | 244/215 |
| 2011/0031349 A1* | 2/2011 | Wildman et al. | 244/123.1 |
| 2011/0174933 A1* | 7/2011 | Blades | B64C 7/00 244/213 |
| 2011/0186690 A1* | 8/2011 | Stewart | 244/215 |
| 2011/0272532 A1* | 11/2011 | Matsuda | 244/215 |
| 2012/0234983 A1* | 9/2012 | Wildman | B64C 9/20 244/215 |

\* cited by examiner

METHODS AND APPARATUS TO CONTROL A GAP BETWEEN MOVABLE AIRCRAFT WING COMPONENTS

FIELD OF THE DISCLOSURE

This patent relates to aircraft wing components and, more specifically, to methods and apparatus to control a gap between movable aircraft wing components.

BACKGROUND

Spoilers may be used in aircrafts for ground braking, roll control and/or reducing the speed of an aircraft in flight. Drooping spoilers, which are movable (e.g., move up and/or down) relative to flaps, may be used to enable smooth airflow over the respective wings. However, to substantially reduce contact loads between the spoilers and the flaps that may result from the movability of the spoiler, costly, complex and heavy linkage is used to control the movement of the spoilers.

SUMMARY

An example apparatus includes a body having a trailing edge and a leading edge. The leading edge is to be coupled to an aircraft wing. The trailing edge is to engage a flap of the aircraft wing. The body includes a structure located between the trailing edge and the leading edge. The structure is to engage the flap to maintain a distance between the body and the flap.

An example method includes directing a spoiler of an aircraft to a location and enabling the spoiler to engage a flap at a distance from a trailing edge of the spoiler to minimize a load applied to the trailing edge of the spoiler.

The features, functions, and advantages that have been discussed can be achieved independently in various embodiments or may be combined in yet other embodiments further details of which can be seen with reference to the following description and drawings.

DETAILED DESCRIPTION

Figure 1:
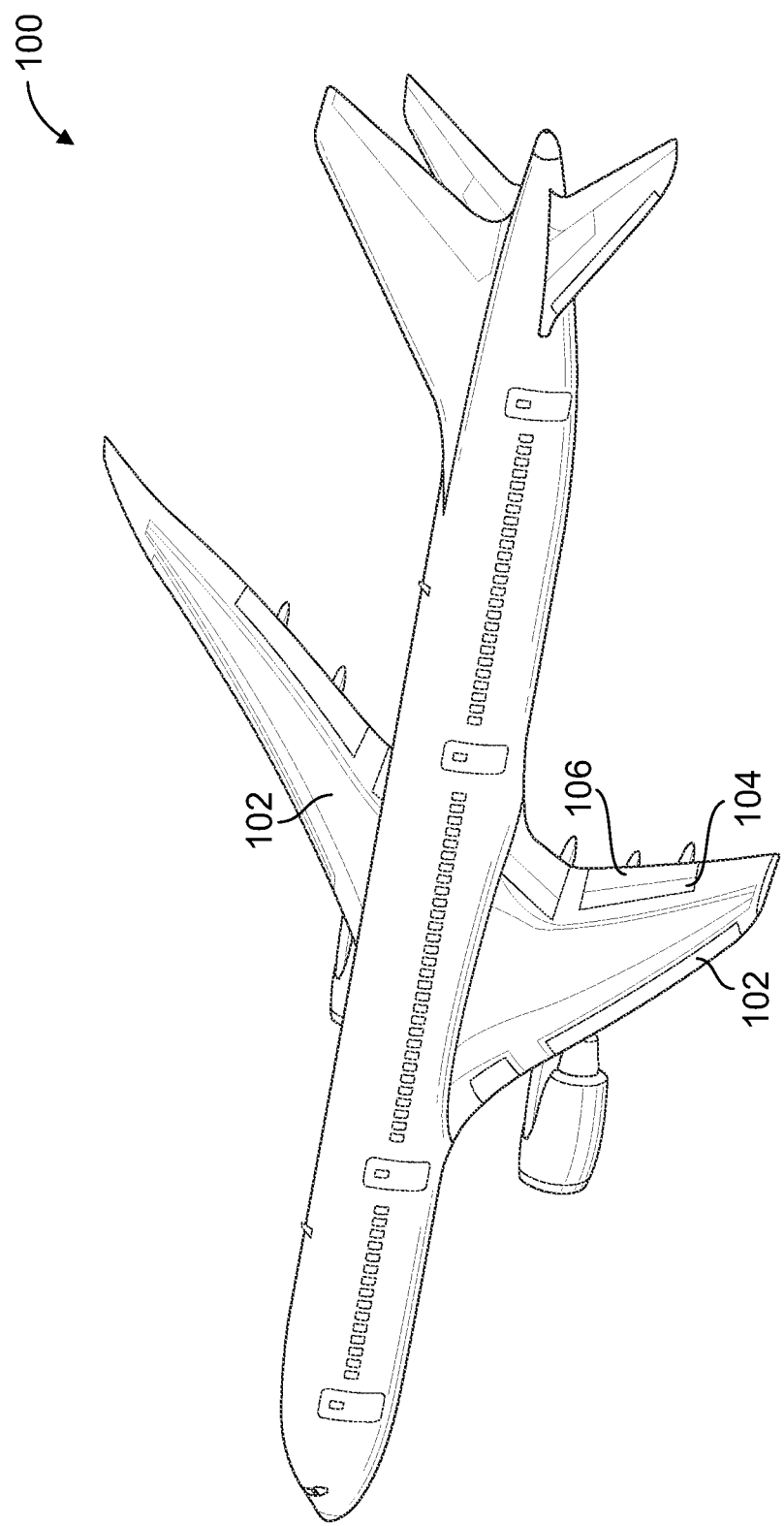
FIG. 1 depicts an example aircraft in which the examples disclosed herein can be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to methods and apparatus for controlling a gap and/or distance between a spoiler and a flap of an aircraft (e.g., large transport aircrafts). By controlling the distance between the spoiler and the flap in, for example, a cruise configuration, a relatively low contact force seal is substantially ensured between the spoiler and the flap. In some examples, to increase manufacturing tolerances between the angular position of the spoiler and the flap and to reduce the number of parts and/or cost while maintaining and/or increasing the performance of the spoiler and/or the flap, there are two spaced-apart contact areas and/or points between the spoiler and the flap.

Using the examples disclosed herein, the tip and/or the end of the spoiler may be precisely positioned relative to the flap to substantially prevent a gap between the spoiler and the flap and/or excessive contact loads between the spoiler and the flap. The occurrence of gaps and/or excessive contact loads between the spoiler and the flap may increase with aircrafts having drooping spoilers in which, in the cruise configuration, the spoiler is in an intermediate command actuator position. In some examples, drooping spoilers are spoilers that move downward with the flap to substantially ensure smooth airflow over the wing.

In contrast to the examples disclosed herein, non-drooping spoilers have adjustable hard stops that are engaged when the spoiler is in the cruise configuration to prevent the spoiler from drooping and/or applying excessive contact loads between the spoiler and the flap. In contrast to the examples disclosed herein, some drooping spoilers require costly, complex and relatively heavy linkage to enable the spoiler to droop and/or move downward with the flap.

In some examples, to monitor the spoiler to flap contact loads and/or increase the positional accuracy of the spoiler and/or the flap, sensors may be used to determine the spoiler angle. However, such sensors may be costly to obtain and/or install and may require maintenance. To decrease contact loads, wear surfaces and/or rub strips may be installed on the flaps. However, such wear surfaces and/or rub strips may be relatively heavy, require maintenance and/or incur an aerodynamic penalty.

The examples disclosed herein maintain a distance between a spoiler and a flap using an example rub block positioned, integrated with and/or coupled to an underside of the spoiler panel. The rub block may be sized, shaped and/or positioned to contact the flap in the cruise configuration to enable trailing edge variable camber operation. In some examples, trailing edge camber operation is associated with changing the camber of the wing by incrementally adjusting the flap (e.g., 0.5° adjustments) in flight. The flap may be adjusted upwards or downwards from the nominal cruise position based on weight changes of the aircraft due to, for example, fuel consumption.

In some examples, the rub block is sized and/or shaped to react spoiler to flap contact forces during a failure condition in which the flap retracts into and forcibly raises the spoiler and/or when the spoiler drives downward into the flap. To distribute the load and/or increase load capabilities, the rub block may have a relatively large spanwise width. In some examples, the rub block spans the entire width of the spoiler. In some examples, the rub block is shaped and/or configured to enable the load to be distributed evenly to the contacting flap. Aft and/or behind the rub block, the spoiler may include an integral, relatively thin and flexible spoiler tip. In some examples, the spoiler tip may be sized to substantially ensure a particular contact load when the rub block contacts the flap. To substantially reduce local deflection, larger contact loads between the spoiler and the flap may be reacted in a location where the spoiler body is relatively stiffer using one or more wear pads located on an underside of the spoiler and/or adjacent the spoiler tip.

In operation, when contact occurs between the spoiler and the flap, the flexible tip of the spoiler deforms into an aerodynamic shape (e.g., an ideal aerodynamic shape). The limited contact load between the spoiler and the flap enables the spoiler to have a relatively thin trailing edge that substantially improves aerodynamic performance. By providing a first contact point and/or area adjacent the trailing edge and a second contact point and/or area forward of the trailing edge, the allowable total combined contact load may be increased. In some examples, the forward contact point, area and/or rub block may be able to receive a larger contact load based on its material, contact surface, etc. For example, the rub block may have relatively high wear characteristics and may be made of composite, polymer, Polyoxymethylene, Delrin, Phenolic, etc. Based on the increased allowable contact load, a larger chord spoiler may be used for a given sensor arrangement and/or the supplemental sensor arrangement (e.g., sensors external of the actuators) may not be used. Removing supplemental sensors arrangements decreases the cost and/or weight of the aircraft.

FIG. 1 illustrates an example aircraft 100 having wings 102 in accordance with the teachings of this disclosure. In some examples, the wings 102 include drooping spoilers 104 that are movable (e.g., move up and/or down) with flaps 106 to substantially ensure smooth airflow over the respective wings 102.

Figure 2:
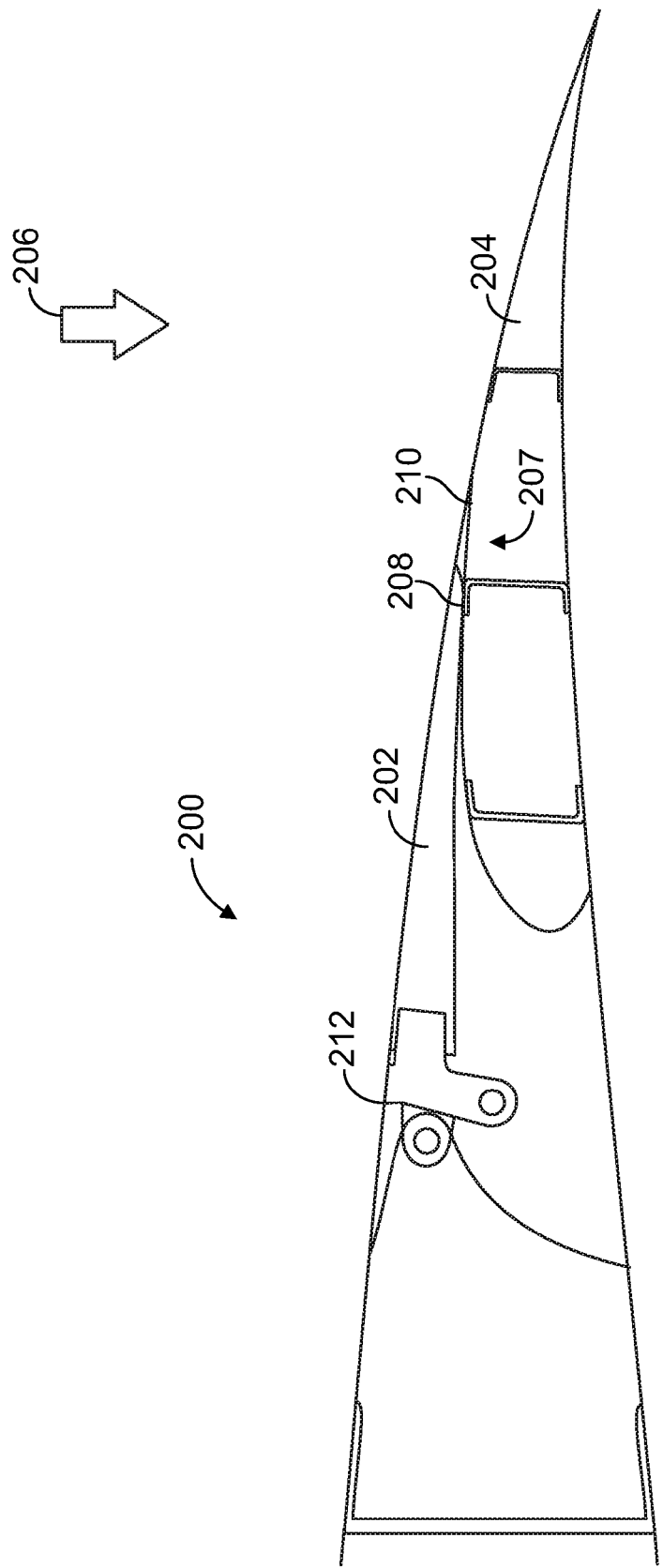
FIG. 2 depicts a portion of an example wing that can be used to implement the wings of the example aircraft of FIG. 1.
Figure 3:
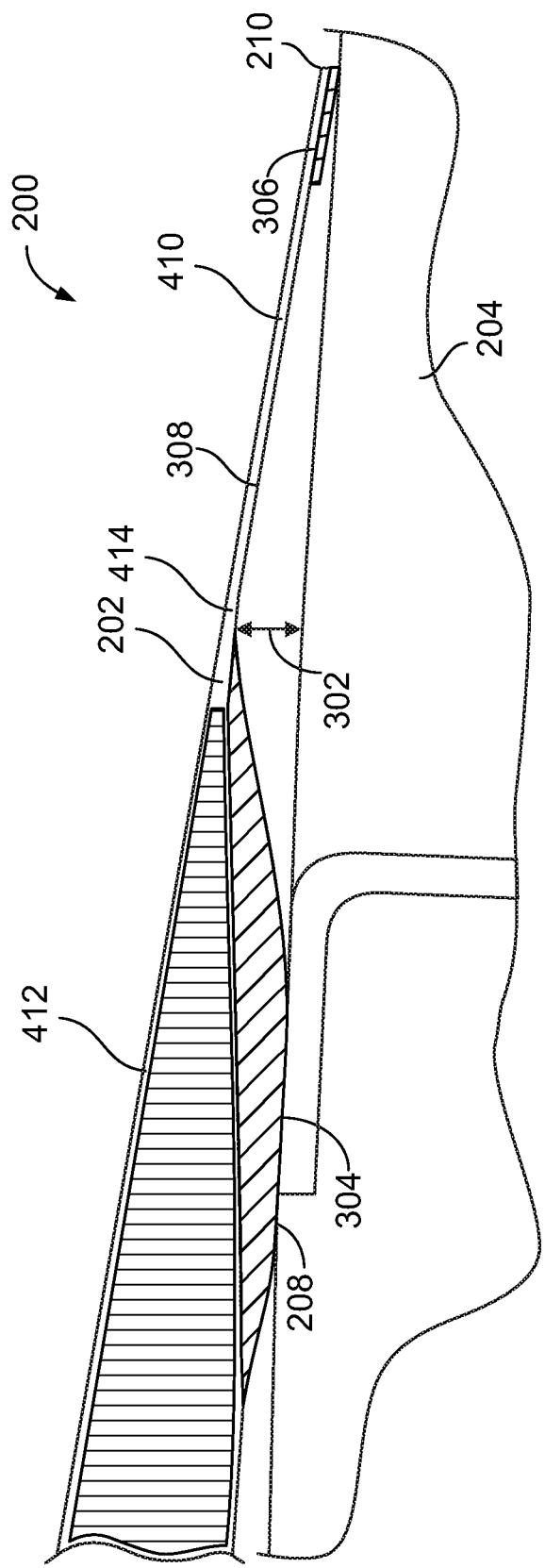
FIGS. 3-7 depict different positions of an example spoiler having an example rub block and an example flap that can be used to implement the examples disclosed herein.

FIGS. 2 and 3 depict a portion of an example aircraft wing 200 in accordance with the teaching of this disclosure. The wing 200 includes an example spoiler 202 and a flap 204. In this example, the spoiler 202 is a drooping spoiler that can move in a direction generally indicated by arrow 206 to enable smooth airflow over the wing 200 regardless of the wing configuration (e.g., a cruising configuration), flap configuration etc. For example, the spoiler 202 can generally move in the direction of and/or opposite the direction of the arrow 206 if the wing 200 is used on an aircraft (e.g., the aircraft 100) having trailing edge variable camber operation. In such examples, the flap 202 may rotate upwards a small amount (e.g., 1 or 2 degrees). To maintain a seal at an interface point 207, the spoiler 204 may rotate upwards to substantially match the motion of the flap 202.

In other examples, to create drag and/or a downward force on the wing 200, the spoiler 202 is rotated in a direction opposite the direction of the arrow 206. In such examples, because the spoiler 202 is rotated to create drag and/or a downward force on the wing 200, sealing engagement between the spoiler 202 and the flap 204 is not maintained (e.g., at a leading edge 210 or a trailing edge 212 of the spoiler 202 and the flap 204).

To enable the spoiler 202 to engage the flap 204 at multiple points and to control the position of the spoiler 202, the spoiler 202 includes a structure and/or rub block 208 positioned between the trailing edge 210 and the leading edge 212 of the spoiler 202. In a cruise configuration, as shown in FIGS. 2 and 3, a first surface 304 of the rub block 208 engages the flap 204 and substantially maintains a gap and/or distance 302 (FIG. 3) between the spoiler 202 and the flap 204. The rub block 208 may be made of any suitable material(s) that is a wear resistant low friction material and/or bondable to the main body of the spoiler 202. Some materials that the rub block 208 may be made of include delrin and/or phenolic. The wear resistance properties substantially prevent the rub block 208 from wearing away under contact with the flap 204. The low friction properties substantially minimize the wear that the rub block 208 imparts to the flap 204.

In some examples, main panels of the spoiler 202 are made from BMS 8-256 preimpregnated carbon fabric sandwich construction (e.g., the 787 for Boeing, the 777 for Boeing) or metalbond sandwich construction (e.g., the 737NG for Boeing). In some examples, the lower surface of the BMS 8-256 spoiler is finished with a ply tedlar. In some examples, a tip of the spoiler 202 adjacent the trailing edge 210 (e.g., 787 for Boeing) is made from a thin BMS 8-256 laminate that is finished with enamel paint. In some examples, the tip of the spoiler 202 is made from thin carbon laminates, thin fiberglass laminates and/or hybrid laminates of fiberglass and carbon based upon the competing requirements for flexibility and stiffness.

In some examples, upper skins of the flap 204 are made from BMS 8-256 preimpregnated carbon fabric sandwich construction (e.g., the 777 for Boeing) and/or HMS9-001 resin infusion laminated carbon fabric panels (e.g., the 787 for Boeing). In some examples, the flap 204 is finished with enamel paint and further protected by Teflon® paint at contact wear areas with the spoiler 202 to provide additional protection.

In some examples, the spoiler 202 contacts the flap 204 only in a cruise position (e.g., including trailing edge variable camber operation), or sealed take-off positions for low flap angles (e.g., generally less than 10 degrees). During normal cruise operation, the rub block 208 on the spoiler 202 contacts the flap 204 with a force that is significantly less than the capability of the spoiler 202.

In some examples, the shape of the rub block 208 accounts for the variability of the exact contact position between the spoiler 202 and flap 204. The relatively broad contact area provided by the rub block 208 substantially ensures consistent sealing through trailing edge variable camber and sealed take-off positions without excessive wear on the flap 202. The relatively broad contact area provided by the rub block 208 enables the required accuracy of the spoiler position system to be reduced, thereby reducing the cost and the weight of such systems.

In some examples, to reduce an amount of wear of the trailing edge 210 or flap 204, one or more wear pads 306 may be coupled to an underside surface 308 of the spoiler 202. The wear pads 306 may be made of any suitable material such as Delrin.

As shown in FIG. 3, the compliant trailing edge 210 may be deflected slightly during normal operation and/or in the cruise position. The slight deflection of the trailing edge 210 in the normal cruise position, shown in FIG. 3, enables sealing at slightly different flap 204 cruise positions (e.g., during trailing edge variable camber) and enables the contact loads between the spoiler 202 and the flap 204 to be distributed between two points, thereby reducing contact stress and/or wear between the flap 204 and the spoiler 202. The slight deflection of the trailing edge 210 enables aerodynamic fair between the spoiler 202 and the flap 204. In some examples, because the trailing edge 210 is relatively thin relative to the tip of the spoiler 202, an aft facing step is smaller and produces less aerodynamic drag.

Figure 4:
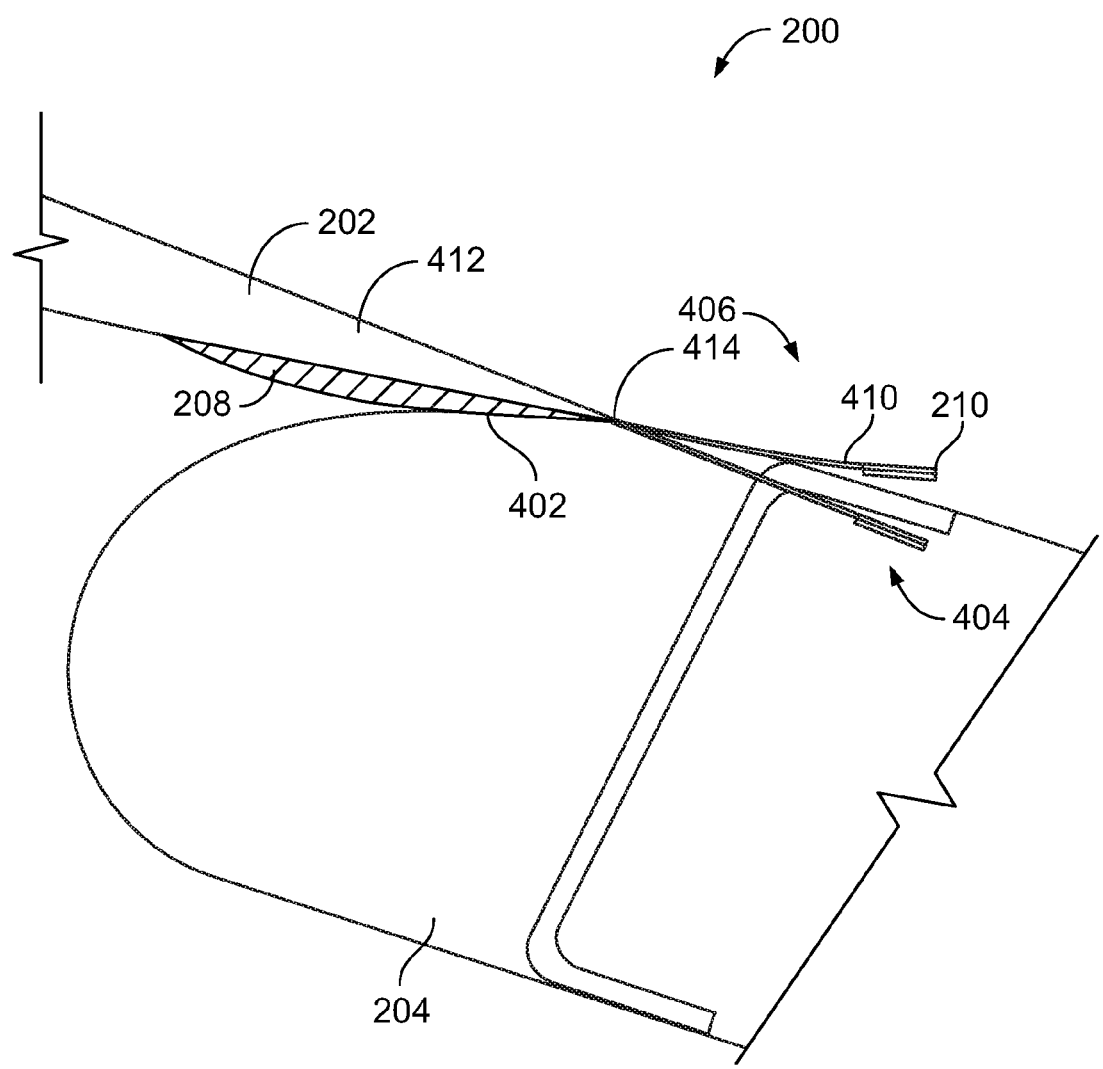

As shown in FIG. 4, during a failure condition in which the spoiler 202 lowers into the flap 204 (e.g., spoiler hardover) and/or the flap 204 raises into and moves the spoiler 202 (e.g., backdrive), a second surface 402 of the rub block 208 engages the flap 204 to substantially ensure that the trailing edge 210 is not damaged. As shown in FIG. 4, the trailing edge 210 includes a tip 410 that may be relatively thin (e.g., four plies) and may flex relative to the flap 204 without damage from a first and/or non-flexed position 404 to a second and/or flexed position 406 to enable the spoiler 202 to not be damaged when the spoiler 202 engages the flap 204 in a failure condition, for example. As shown in the example of FIGS. 3, 4, 5, 6 and 7, the spoiler 202 includes a portion 412 having a tapered cross-section and the tip 410. As shown in the example of FIGS. 3, 4, 5, 6 and 7, the portion 412 is coupled to the tip 410 at an intersection 414. During spoiler hardover or backdrive failure scenarios, the tip of the spoiler 202 may flex upwards under the large contact loads of the flap 204 without failure (See FIG. 4). In such failure scenarios, all or nearly all of the contact load between flap 202 and the spoiler 204 occurs between the rub block 208 and the flap 204.

During spoiler hardover/backdrive failure conditions, the rub block 208 may react the full spoiler actuator capability. Additionally, during spoiler hardover/backdrive failure conditions, the contact between the rub block 208 and the flap 208 may be at different angles/positions than the contact that occurs during normal operation. For example, during normal operation, all flap 204 to spoiler 202 contact occurs with the flap 204 at zero degrees down (e.g., +/− one or two degrees for trailing edge variable camber). In contrast, during spoiler hardover/backdrive, the flap 204 to spoiler 202 contact may occur at any angle of the flap 204 from zero degrees down to full spoiler 202 down (e.g., the spoiler 202 at approximately 11 degrees, the flap 204 at approximately 25 degrees). Therefore, the spoiler 204 to flap 202 contact may be on the aft face of the rub block 208, as shown in FIG. 4, instead of on the bottom surface of the rub block 208, as shown in FIG. 3. To assist in managing the contact between the flap 204 and the spoiler 202, the rub block 208 may be extended aft with a specific profile depending upon the interface angles.

A spoiler hardover may occur when the spoiler 202 is driven downwards into relatively hard contact with the flap 204 (e.g., equivalent to full spoiler actuator capability). In some examples, a spoiler hardover occurs during a system failure (e.g., not during normal operation) where a spoiler down command is given when the flap 204 is in an up position.

A backdrive (e.g., when the flap 204 moves upwards into the spoiler 202) may occur during a system failure (e.g., not during normal operation). In some examples, a backdrive occurs when the flap 204 is driven upwards into relatively hard contact with the spoiler 202 (e.g., against full spoiler actuator capability). During hardover, because the actuators of the flap 204 are stronger than the actuators of the spoiler 202, the flap 204 contacts the spoiler 202 and physically pushes the spoiler 202 back (e.g., upwards) until the flap 204 stops moving.

Figure 5:
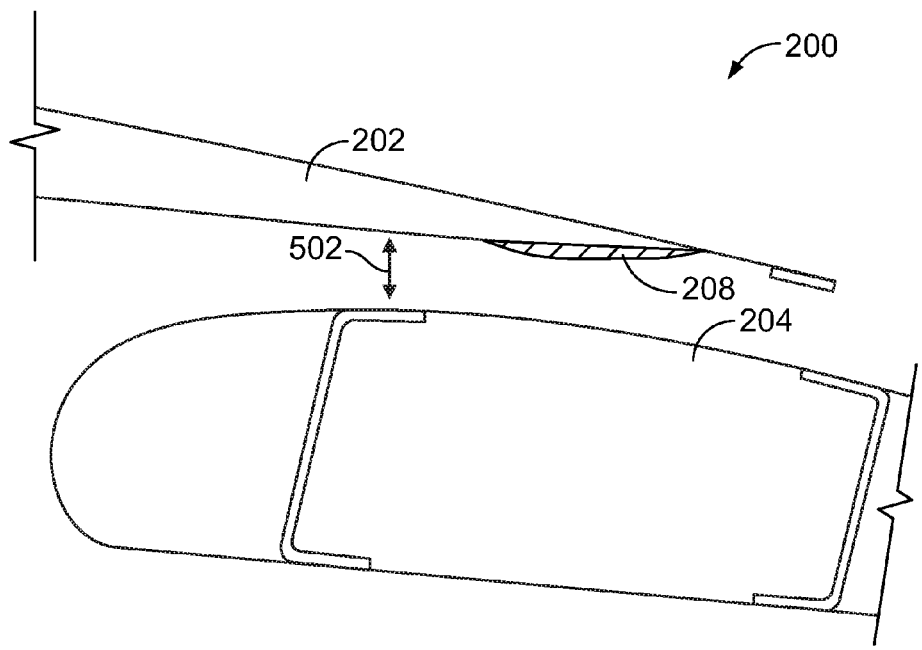

FIG. 5 depicts the wing 200 in a potential take-off configuration in which the spoiler 202 and/or the flap 204 are lowered five degrees relative to, for example, the cruise configuration. In some examples, such as in the take-off configuration and/or the landing configuration, the rub block 208 does not contact the flap 204 when the spoiler 204 is rotated further down because a gap 502 is required between the flap 202 and spoiler 204 for these positions.

Figure 6:
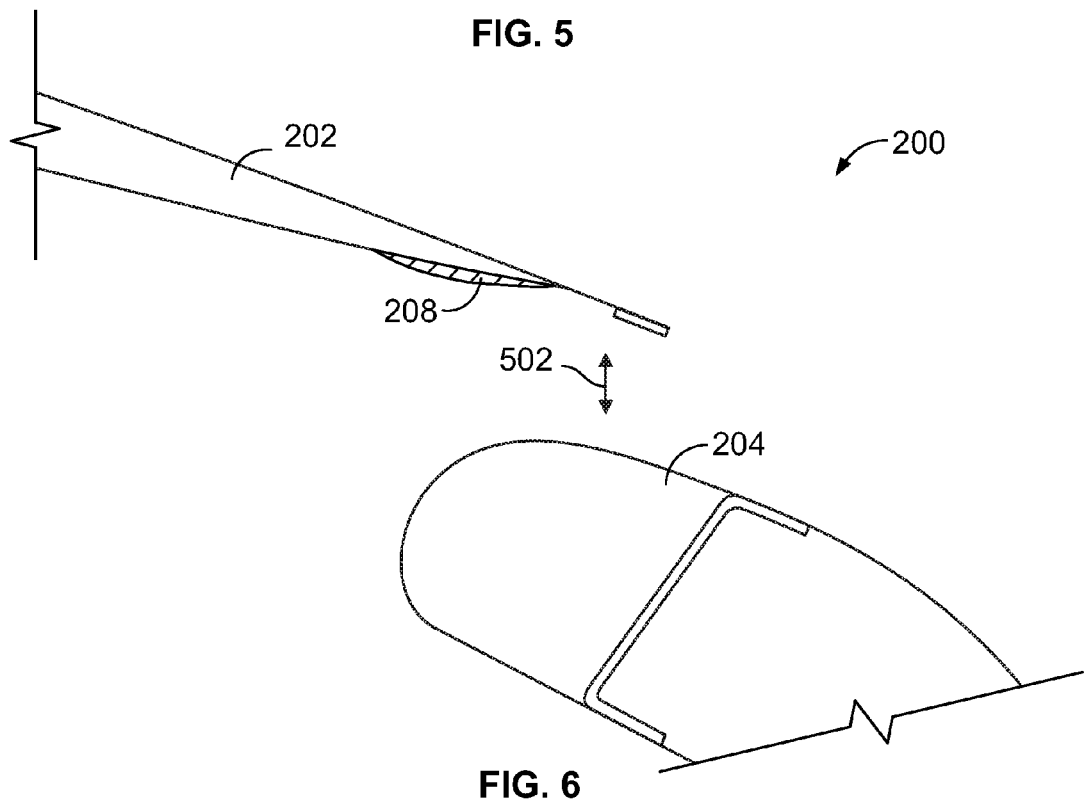

FIG. 6 depicts the wing 200 in a potential landing configuration in which the flap 204 is lowered up to 30 degrees relative to, for example, the cruise configuration. In some examples, the rub block 208 has a contour to enable smooth airflow between the spoiler 202 and the flap 204 in the take-off and/or the landing configurations.

The positioning of the flap 204 and/or the spoiler 202 at takeoff and landing is dictated by low speed aerodynamics specialists and varies between aircrafts. For aircrafts with drooping spoilers (e.g., the 787 for Boeing), from the cruise position, the flap 204 and the spoiler 202 both rotate downwards for takeoff and landing positions. As the flap 204 rotates downwards, the spoiler 202 follows, but at a slower rate to enable the gap 502 to develop between the tip of the spoiler 202 and the body of the flap 204. This is beneficial for aerodynamic performance of the wing 200 during takeoff and/or landing, for example. A width of the gap 502 may increase as the flap 204 moves downwards. The rotation of the flap 204 also carries the flap 204 aft relative to the tip of the spoiler 202 and reduces the overlap between the devices.

In some examples, the difference between landing and takeoff positions is associated with the rotational angle of the flap 204. The rotational angle of the flap 204 during takeoff may be a lesser angle (e.g., 10-20 degrees) while the rotational angle of the flap 204 during takeoff may be a greater angle (e.g., 30-40 degrees). The landing position provides the greatest lift, enabling lower aircraft landing speeds, but at the cost of greater drag. The takeoff position provides relatively less lift than landing position, but with less drag.

Figure 7:
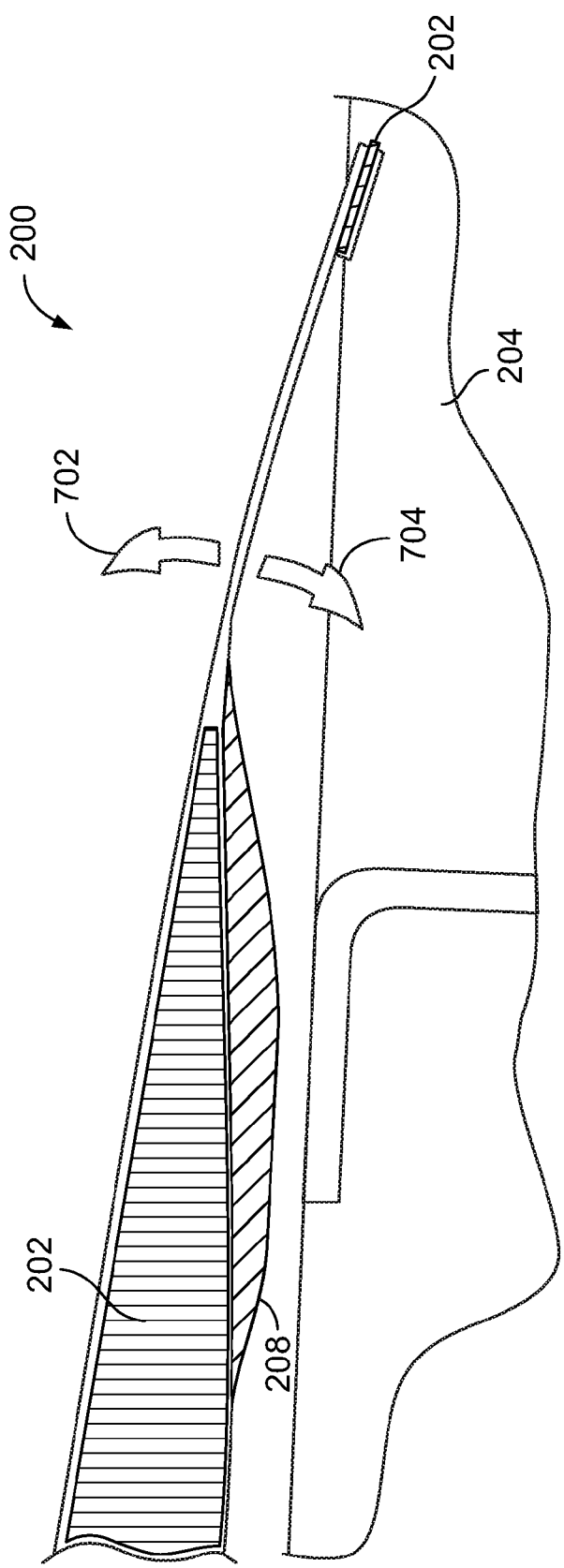

FIG. 7 illustrates the positioning tolerance between the spoiler 202 and the flap 204 when the spoiler 202 is rotated in a direction generally indicated by arrow 702. For example, if the spoiler 202 is rotated such that the rub block 208 disengages the flap 204, the trailing edge 210 may maintain sealing engagement with the flap 204. Alternatively, if the spoiler 202 is rotated in a direction generally indicated by arrow 704, the rub block 208 may engage the flap 204 and the trailing edge 210 may deflect and/or deform in the direction generally indicated by arrow 702 to enable the spoiler 202 to have a relatively aerodynamic shape (e.g., similar to FIG. 3).

Figure 8:
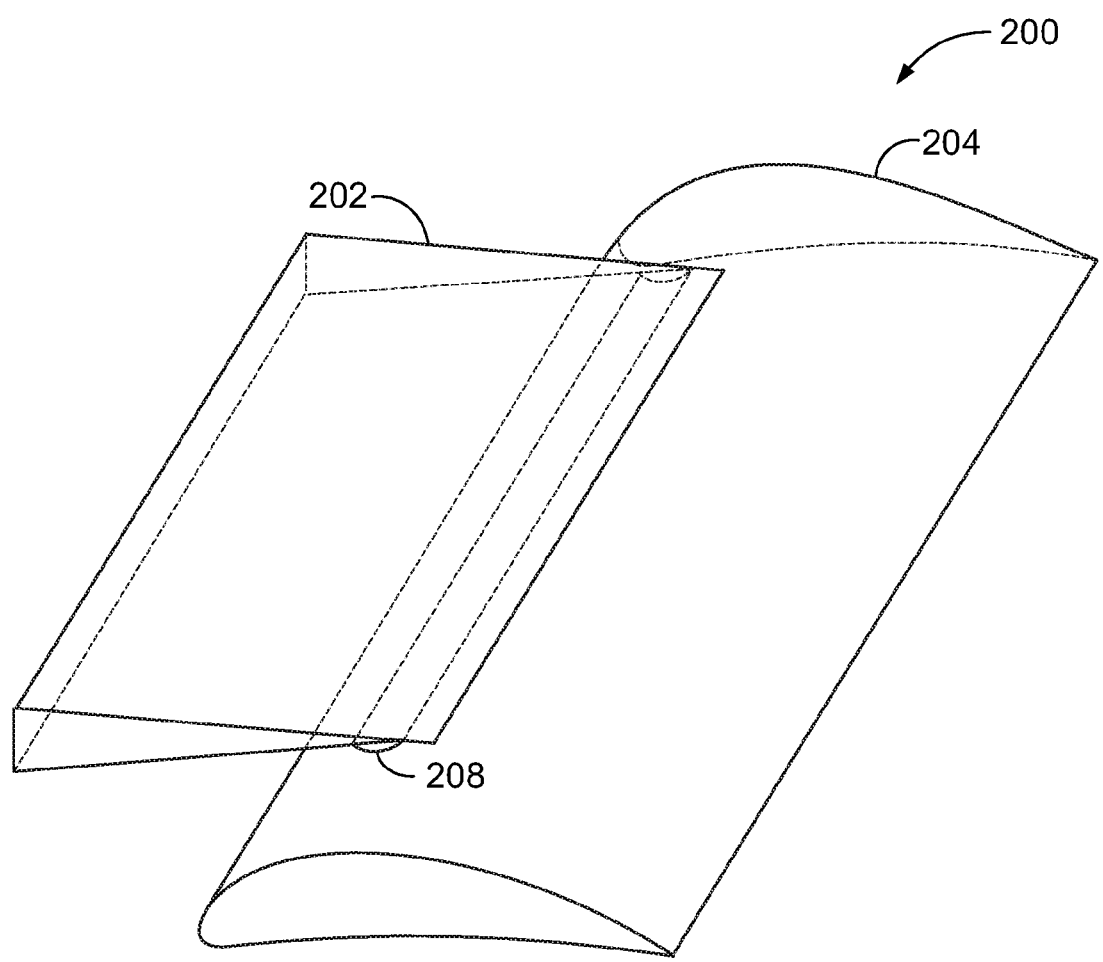
FIG. 8 depicts an isometric view of the example spoiler and the example flap.

FIG. 8 depicts an isometric view of the spoiler 202 and the flap 204. In the illustrated example, the rub block 208 is a single structure that spans substantially the entire spoiler 202. However, in other examples, the rub block 208 may include a plurality of spaced-apart pieces, a single piece that does not span the entire spoiler 202 and/or a plurality of closely spaced adjacent pieces.

The examples disclosed herein improve the performance of a spoiler by enabling the spoiler to contact a flap at a point along a lower surface of the spoiler, thereby improving the aerodynamics of the wing and minimizing the gap between the flap leading edge and the spoiler trailing edge in the flap retracted configuration. The examples disclosed herein enable the spoiler to be directed and/or positioned in a particular position while also minimizing a load applied by the flap to the spoiler trailing edge. In some examples, the lower surface of the spoiler is a lower surface forward of the spoiler trailing edge. To improve the performance of and/or reduce the wear of the spoiler, shims and/or rub strips may be installed, integrated into and/or coupled on the lower surface of the spoiler forward of the spoiler trailing edge.

As set forth herein, an example apparatus includes a body having a trailing edge and a leading edge. The leading edge is to be coupled to an aircraft wing. The trailing edge is to engage a flap of an aircraft wing. The body includes a structure located between the trailing edge and the leading edge. The structure is to engage the flap to maintain a distance between the body and the flap In some examples, the body includes a spoiler. In some examples, the structure includes a rub block. In some examples, the structure is to span substantially the entire body. In some examples, the apparatus is to be used with an aircraft comprising trailing edge variable camber operation. In some examples, the structure is to enable a relatively low contact force seal between the trailing edge and the flap. In some examples, an interaction between the body and the flap is to substantially ensure relatively smooth airflow over the aircraft wing.

In some examples, an interaction between the trailing edge and the flap is to deform the trailing edge to a relatively aerodynamic shape. In some examples, the apparatus includes one or more wear strips coupled adjacent the trailing edge. The one or more wear strips are to engage the flap. In some examples, the structure comprises a shape to enable relatively smooth airflow between the body and the flap. In some examples, the structure includes a contour to enable the flap to engage and move the body, via the structure, in a failure condition. In some examples, the structure is to maintain the distance between the body and the flap in a cruise configuration.

Another example includes a spoiler for use with an aircraft and a flap for use with the aircraft. A trailing edge of the spoiler to engage the flap. The apparatus includes means for maintaining a gap between the spoiler and the flap. In some examples, the means for maintaining the gap includes a structure located between the trailing edge and a leading edge of the spoiler. The structure is to engage the flap. In some examples, the structure is to span substantially the entire spoiler. In some examples, the structure is to enable a relatively low contact force seal between the trailing edge and the flap. In some examples, the structure includes a shape to enable relatively smooth airflow between the body and the flap. In some examples, the apparatus is to be used with an aircraft comprising trailing edge variable camber operation.

An example method includes directing a spoiler of an aircraft to a location and enabling the spoiler to engage a flap at a distance from a trailing edge of the spoiler to minimize and/or be capable of reacting to a load applied to the trailing edge of the spoiler. In some examples, the method includes providing a structure at a distance from the trailing edge to maintain a distance between the spoiler and the flap.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
   a spoiler including:
   a trailing edge;
   a leading edge, the leading edge to be coupled to an aircraft wing, the spoiler having a tapered portion and a flexible tip, the tapered portion including the leading edge, the flexible tip including the trailing edge, the trailing edge to engage a flap of the aircraft wing; and
   a structure located between the trailing edge and the leading edge, an end of the structure being closer to an intersection between the tapered portion and the flexible tip than to the trailing edge, when the structure engages a first portion of the flap, the structure maintains a distance between the spoiler and the flap to enable the trailing edge to engage a second portion of the flap, the structure ending adjacent the intersection between the tapered portion and the flexible tip to enable the engagement between the trailing edge and the second portion to elastically deform the trailing edge to change a camber of the aircraft wing, the engagement between the structure and the flap to enable a reduced contact force seal between the trailing edge and the second portion.

2. The apparatus of claim 1, wherein the structure is a rub block.

3. The apparatus of claim 1, wherein the structure is to span substantially a majority of the spoiler.

4. The apparatus of claim 1, wherein an interaction between the spoiler and the flap is to enable smoother airflow over the aircraft wing.

5. The apparatus of claim 1, further including one or more wear strips coupled adjacent the trailing edge, the one or more wear strips to engage the flap, the one or more wear strips spaced from the structure.

6. The apparatus of claim 1, wherein the structure includes a shape to enable smoother airflow between the spoiler and the flap.

7. The apparatus of claim 1, wherein the structure includes a contour to enable the flap to engage and move the spoiler, via the structure, in a failure condition without plastically deforming the spoiler.

8. The apparatus of claim 1, wherein the structure is to maintain the distance between the spoiler and the flap in a cruise configuration.

9. The apparatus of claim 1, wherein the spoiler is a drooping spoiler.

10. The apparatus of claim 1, wherein the structure includes a first surface, a second surface, and a third surface, the first surface being closest to the leading edge, the third surface being closest to the trailing edge, the second surface disposed between the first surface and the third surface, the first, second, and third surfaces being out of coplanar alignment, the second surface to engage the flap in a first position of the flap or the spoiler, the third surface to engage the flap in a second position of the flap or the spoiler.

11. The apparatus of claim 1, wherein the structure is a solid structure.

12. The apparatus of claim 1, wherein the structure is coupled to an underside of the spoiler, the spoiler extending to the trailing edge, the spoiler being different than the structure, a wear pad being coupled to the spoiler at the trailing edge, the wear pad being spaced from the structure.

13. The apparatus of claim 1, wherein the flexible tip is sized to enable the flexible tip to flex when the trailing edge engages the second portion of the flap.

14. The apparatus of claim 13, wherein the flexible tip includes four plies.

15. The apparatus of claim 1, wherein the flexible tip extends past the tapered portion to the trailing edge, the structure attached to an underside of the spoiler such that an end of the structure is at an end of the tapered portion.

16. An apparatus, comprising:
   a spoiler for use with an aircraft, the spoiler including a tapered portion and a flexible tip, the tapered portion including a leading edge, the flexible tip including a trailing edge;
   a flap for use with the aircraft, the trailing edge of the spoiler to engage the flap; and
   means for maintaining a gap between the spoiler and the flap, when the means for maintaining the gap engages a first portion of the flap, the means for maintaining the gap enables the trailing edge to engage a second portion of the flap, an end of the means for maintaining the gap being closer to an intersection between the tapered portion and the flexible tip than to the trailing edge, the means for maintaining the gap ending adjacent the intersection between the tapered portion and the flexible tip to enable the engagement between the trailing edge and the second portion to elastically deform the trailing edge to change a camber of a wing of the aircraft, the means for maintaining the gap to enable a reduced contact force seal between the trailing edge and the flap.

17. The apparatus of claim 16, wherein the means for maintaining the gap includes a structure located between the trailing edge and the leading edge of the spoiler, the structure to engage the flap, the structure being coupled to an underside of the spoiler, the structure to engage the first portion of the flap to maintain a distance between the spoiler and the flap, the trailing edge to engage the second portion of the flap, the engagement between the structure and the flap to enable the reduced contact force seal between the trailing edge and the second portion.

18. The apparatus of claim 17, wherein the structure is to span substantially a majority of the spoiler.

19. The apparatus of claim 17, wherein the structure includes a shape to enable smoother airflow between the spoiler and the flap.

20. A method, comprising:
directing a spoiler of an aircraft to a location, the spoiler including a tapered portion and a flexible tip, the tapered portion including a leading edge, the flexible tip including a trailing edge;
enabling a first surface of a structure on an underside of the spoiler to engage a first portion of a flap in a first position of the spoiler or the flap, the structure spaced from the trailing edge of the spoiler; and
enabling a second surface of the structure to engage the first portion of the flap in a second position of the spoiler or the flap, the first position associated with a normal operation of the aircraft or a cruise position, the second position associated with spoiler hardover, a failure condition, or flap backdrive, when the structure engages the first portion of the flap, the structure maintains a distance between the spoiler and the flap to enable the trailing edge of the spoiler to engage a second portion of the flap, the structure ending adjacent an intersection between the tapered portion and the flexible tip to enable the engagement between the trailing edge and the second portion to elastically deform the trailing edge to change a camber of an aircraft wing, the engagement between the structure and the flap to minimize a load applied to the trailing edge of the spoiler.

* * * * *